US006622091B2

(12) United States Patent
Perlmutter et al.

(10) Patent No.: US 6,622,091 B2
(45) Date of Patent: Sep. 16, 2003

(54) METHOD AND SYSTEM FOR CALIBRATING AN IG/GP NAVIGATIONAL SYSTEM

(75) Inventors: Michael S. Perlmutter, Sherborn, MA (US); Ian Humphrey, Foxboro, MA (US)

(73) Assignee: Fibersense Technology Corporation, Canton, MA (US)

( * ) Notice: Subject to any disclaimer, the term of this patent is extended or adjusted under 35 U.S.C. 154(b) by 83 days.

(21) Appl. No.: 09/965,746

(22) Filed: Sep. 28, 2001

(65) Prior Publication Data

US 2002/0169553 A1 Nov. 14, 2002

Related U.S. Application Data

(60) Provisional application No. 60/290,044, filed on May 11, 2001.

(51) Int. Cl.[7] .............................................. G01C 21/26
(52) U.S. Cl. ...................................... 701/214; 701/220
(58) Field of Search ................................. 701/213, 214, 701/215, 220, 221

(56) References Cited

U.S. PATENT DOCUMENTS

| 4,590,569 | A | | 5/1986 | Rogoff et al. |
|---|---|---|---|---|
| 5,194,872 | A | | 3/1993 | Musoff et al. |
| 5,527,003 | A | | 6/1996 | Diesel et al. |
| 5,786,790 | A | | 7/1998 | Abbott |
| 6,292,750 | B1 | * | 9/2001 | Lin .............................. 701/214 |
| 6,311,129 | B1 | * | 10/2001 | Lin .............................. 701/214 |
| 6,424,914 | B1 | * | 7/2002 | Lin .............................. 701/214 |

* cited by examiner

Primary Examiner—William A Cuchlinski, Jr.
Assistant Examiner—Edward Pipala
(74) Attorney, Agent, or Firm—McDermott, WIll & Emery (57) ABSTRACT

A method of calibrating acceleration data signals from a set of accelerometers, and angular rate data signals from a set of gyroscopes within a combined GPS/IGS includes generating navigation data as a function of the acceleration data signals, the angular rate data signals, and prior navigation data. The method further includes combining the navigation data with GPS data via a Kalman filter, so as to produce corrected navigation data, navigation correction data, acceleration correction data and angular rate correction data. The method further includes modifying the acceleration data signals as a function of the acceleration correction data so as to calibrate the acceleration data signals, and modifying the angular rate data signals as a function of the angular rate correction data, so as to calibrate the angular data signals.

44 Claims, 5 Drawing Sheets

METHOD AND SYSTEM FOR CALIBRATING AN IG/GP NAVIGATIONAL SYSTEM

CROSS-REFERENCE TO RELATED APPLICATIONS

This application claims the benefit of U.S. Provisional Application No. 60/290,044 entitled "METHOD OF CALIBRATING AN IG/GP NAVIGATIONAL SYSTEM" filed on May 11, 2001, the disclosure of which is entirely incorporated herein by reference.

BACKGROUND OF THE INVENTION

The present invention relates to navigation systems, and more particularly, to methods of improving the performance of navigational systems by utilizing one or more external sources of information, for example a global positioning (GP) system (also referred to herein as GPS).

Typical prior art inertial guidance (IG) systems can calculate position with a high degree of accuracy. To attain such accuracy, these IG systems require precise gyroscopes that are extremely costly, but are characterized by a low measurement error, typically on the order of 100 degrees per hour. By contrast, many commercial applications use a lower grade of gyroscope, typically a micro-machine gyroscope, which is relatively inexpensive. These micro-machine gyroscopes include a relatively large measurement error, typically ranging from approximately one degree to ten degrees per second. Such low-grade gyroscopes are most suitable for gross movement detection (e.g., detection of automobile roll-over, and air bag deployment systems) rather than fine movement detection required by an IG system.

Gyroscope measurement error can generally be divided into the categories of bias error and scaling error. All gyroscopes have a certain degree of measurement error that is present upon initialization, referred to as bias error. The instrument using the gyroscope can apply some measure of compensation for this error, but the effectiveness of such compensation is limited because the actual degree of initialization error may be different for each individual gyroscope. In addition, each time an individual gyroscope is turned on, the amount of bias error may be different. For instance, one initialization might result in an error of one degree per second and the next initialization might result in an error of two degrees per second.

The second category of error, referred to herein as scaling error, that accumulates over the angle through which a gyroscope is being rotated. Scale factor error is essentially an "input to output" error, i.e., the difference between the actual angle of rotation the gyroscope experiences and the angle of rotation indicated at the gyroscope output. A gyroscope indicating that it had turned ninety degrees when it had, in fact, turned ninety-two degrees, is an example of scaling error. The amount of scaling error may be affected by various environmental factors, so that a fixed compensation value will not be sufficient to produce completely accurate data.

GPS navigation systems are widely used and are rapidly being incorporated into many newly manufactured commercial vehicles. Such vehicles often operate in city environments, however, resulting in substantial blackout periods while in so-called "urban icanyons," i.e., while between tall buildings that obscure the line-of-sight to the GPS satellites. A collocated IG system can provide continuous navigational information during these blackout periods, but the high cost of the precise gyroscopes required by typical prior art IG systems virtually precludes their use in a commercial vehicle. Hence, a general need exists for a method of improving the accuracy of low grade gyroscopes. It is an object of the present invention to substantially overcome the above-identified disadvantages and drawbacks of the prior art.

U.S. Pat. No. 4,590,569, entitled "Navigation System Including An Integrated Electronic Chart Display", assigned to Navigation Sciences Inc. (Bethesda, Md.), describes a navigation system particularly adapted for ships making a passing within a harbor or the like. The system utilizes signal inputs from on-board vessel position determining equipment such as Loran or Decca apparatus and an on-board object detecting equipment such as a radar or sonar apparatus. The system further includes an on-board vessel position computer which operates in a differential Loran mode in response to observed Loran time differences, stored data from an initial calibration, and Loran grid offset data from an on-shore monitor system to compute a highly accurate current or present position fix in longitude and latitude whereupon the computer causes a predetermined electronic chart to be displayed in color on the screen of a cathode ray tube, being generated from a plurality of electronic charts stored in the form of digital files in memory. The selected chart, together with the present position of the ship, is displayed along with preselected alpha-numeric indicia of data relating to bearings, way points, ranges, "time to go", etc., also generated in accordance with the computed vessel position. Radar target returns of the local land mass and other stationary moving targets are additionally received by the ship's radar. The radar image of the target echoes is next referenced to and superimposed on the electronic chart generated; however, the radar's land mass echoes are suppressed in favor of the electronic chart land mass while displaying all other targets.

U.S. Pat. No. 5,194,872, entitled "Inertial Navigation System With Automatic Redundancy And Dynamic Compensation Of Gyroscope Drift Error," assigned to Charles Stark Draper Laboratory, Inc. (Cambridge, Mass.), describes an inertial navigation system with automatic redundancy and dynamically calculated gyroscopic drift compensation. The system utilizes three, two-degree of freedom gyroscopes arranged whereby any two of the gyroscopes form an orthogonal triad of measurement sensitive axes. The input axes of the three gyroscopes form three pairs of parallel input axes, each pair of parallel input axes corresponding to one axis of the orthogonal triad of axes. The three gyroscopes are operated in a plurality of pre-selected combinations of both clockwise and counter clockwise directions, thus changing the direction of the angular momentum vector by 180.degree. Parity equations are formed from each pair of gyroscope outputs whose measurement sensitive axes are parallel. The parity equations include combinations of gyroscope pairs that have been operated in both the clockwise and counterclockwise directions. Gyroscope drift estimates are then computed using the parity equations to provide individual gyroscope lumped drift corrections (self-calibration) to the inertial guidance and navigation system.

U.S. Pat. No. 5,527,003, entitled "Method For In-Field Updating Of The Gyro Thermal Calibration Of An Inertial Navigation System", assigned to Litton Systems, Inc. (Woodland Hills, Calif.), describes an in-field method for correcting the thermal bias error calibration of the gyros of a strapdown inertial navigation system. The method is begun after initial alignment while the aircraft remains parked with the inertial navigation system switched to navigation mode. Measurements are made of navigation system outputs and of gyro temperatures during this data collection period. A Kalman filter processes the navigation system outputs during this time to generate estimates of gyro bias error that are associated with the corresponding gyro temperature measurements. Heading error correcting is performed after the extended alignment data collection period as the aircraft taxis prior to takeoff. The gyro bias error-versus-temperature data acquired, along with the heading error corrections, are employed to recalibrate the existing thermal model of gyro bias error by means of an interpolation process that employs variance estimates as weighting factors.

U.S. Pat. No. 5,786,790, entitled "On-The-Fly Accuracy Enhancement For Civil GPS Receivers," assigned to Northrop Grumman Corporation (Los Angeles, Calif.), describes a method and means for enhancing the position accuracy of a civil or degraded accuracy GPS receiver by compensating for errors in its position solution with data derived from a military, or precise accuracy, GPS receiver. The civil GPS receiver may be disposed in a mobile expendable vehicle and the military receiver in a mobile launch vehicle. The compensating data is obtained by a comparison of the pseudorange measurements of the military GPS set and another civil GPS set disposed with it in the launch vehicle and attached to the same antenna. Two embodiments are disclosed involving variations of calibration, 1) an On-the-Fly Relative Navigation technique, applicable when the expendable receiver tracks the same satellites as the military and civil sets are tracking, wherein the position bias determined from the measurements of the two launch sets is transferred to the expendable receiver and used to offset its solution, and 2) an On-the-Fly Differential Navigation system, used when the expendable receiver is not tracking the same satellites as the launch sets, wherein the correction process is performed relative to the military set's GPS position solution.

SUMMARY OF THE INVENTION

In one aspect, the invention comprises a method of calibrating acceleration data signals from a set of accelerometers, and angular rate data signals from a set of gyroscopes within a combined GPS/IGS. The method includes generating navigation data as a function of the acceleration data signals, the angular rate data signals, and prior navigation data. The method further includes combining the navigation data with GPS data via a Kalman filter, so as to produce corrected navigation data, navigation correction data, acceleration correction data and angular rate correction data. The method further includes modifying the acceleration data signals as a function of the acceleration correction data so as to calibrate the acceleration data signals, and modifying the angular rate data signals as a function of the angular rate correction data, so as to calibrate the angular data signals.

Another embodiment of the invention further includes receiving the set of acceleration data signals from a set of three mutually orthogonal accelerometers.

Another embodiment of the invention further includes receiving the set of angular rate data signals from a set of three mutually orthogonal gyroscopes.

In another embodiment of the invention, the acceleration correction data includes at least one acceleration bias correction factor. Modifying the acceleration data signals further includes adding the at least one acceleration bias correction factor to the acceleration data signals.

In another embodiment of the invention, the acceleration correction data includes three acceleration bias correction factors corresponding to three accelerometer data signals. The method further includes modifying the acceleration data signals further includes adding each of the three acceleration bias correction factors to the corresponding acceleration data signal.

Another embodiment of the invention further includes storing the at least one acceleration bias correction factor in a memory device, subsequently retrieving the at least one acceleration bias correction factor from the memory device, and adding the retrieved acceleration bias correction factor to the corresponding acceleration data signal.

In another embodiment of the invention, the angular rate correction data includes at least one gyroscope bias correction factor. Modifying the angular rate data signals further includes adding the at least one gyroscope bias correction factor to the angular rate data signals.

In another embodiment of the invention, the angular rate correction data includes three gyroscope bias correction factors corresponding to three angular rate data signals. Modifying the angular rate data signals further includes adding each of the three gyroscope bias correction factors to the corresponding angular rate data signal.

Another embodiment of the invention further includes storing the at least one angular rate bias correction factor in a memory device, subsequently retrieving the at least one angular rate bias correction factor from the memory device, and adding the retrieved angular rate bias correction factor to the corresponding angular rate data signal.

In another embodiment of the invention, the angular rate correction data includes at least one gyroscope scaling correction factor. Modifying the angular rate data signals further includes multiplying the at least one gyroscope scaling correction factor by the angular rate data signals.

In another embodiment of the invention, the angular rate correction data includes three gyroscope scaling correction factors corresponding to three angular rate data signals. Modifying the angular rate data signals further includes multiplying each of the three gyroscope scaling correction factors by the corresponding angular rate data signal.

Another embodiment of the invention further includes storing the at least one gyroscope scaling correction factor in a memory device, subsequently retrieving the at least one gyroscope scaling correction factor from the memory device, and multiplying the retrieved gyroscope scaling correction factor to the corresponding angular rate data signal.

In another embodiment of the invention, modifying the acceleration data signals further includes generating at least one acceleration bias correction factor. The at least one bias correction factor is a predetermined function of the acceleration correction data, the acceleration data signals, and parameters related to the accelerometers. The method further includes adding the at least one acceleration bias correction factor to the acceleration data signals.

In another embodiment of the invention, generating at least one acceleration bias correction factor further includes combining the acceleration correction data, the acceleration data signals, and one or more parameters related to the accelerometers as inputs to an algorithm. The algorithm may be implemented by a sequence of operations executed by a processor. Alternately, the algorithm may be implemented by a logic circuit.

In another embodiment of the invention, generating at least one acceleration bias correction factor further includes combining the acceleration correction data, the acceleration data signals, and one or more parameters related to the accelerometers as inputs to a look up table.

In another embodiment of the invention, modifying the angular rate data signals further includes generating at least one gyroscope bias correction factor. The at least one gyroscope bias correction factor is a predetermined function of the angular rate correction data, the angular data signals, and parameters related to the gyroscopes. The method further includes adding the at least one gyroscope bias correction factor to the angular rate data signals.

In another embodiment of the invention, generating at least one gyroscope bias correction factor further includes combining the angular rate correction data, the angular data signals, and parameters related to the gyroscopes as inputs to an algorithm. The algorithm may be implemented by a sequence of operations executed by a processor. Alternately, the algorithm may be implemented by a logic circuit.

In another embodiment of the invention, generating at least one gyroscope bias correction factor further includes combining the angular rate correction data, the angular data signals, and one or more parameters related to the gyroscopes as inputs to a look up table.

In another embodiment of the invention, modifying the angular rate data signals further includes generating at least one gyroscope scaling correction factor. The at least one gyroscope scaling factor is a predetermined function of the angular rate correction data, the angular data signals, and one or more parameters related to the gyroscopes, and multiplying the at least one gyroscope scaling correction factor by the angular rate data signals.

In another embodiment of the invention, generating at least one gyroscope scaling correction factor further includes combining the angular rate correction data, the angular data signals, and one or more parameters related to the gyroscopes as inputs to an algorithm. The algorithm may be implemented by a sequence of operations executed by a processor. Alternately, the algorithm may be implemented by a logic circuit.

In another embodiment of the invention, generating at least one gyroscope scaling correction factor further includes combining the angular rate correction data, the angular data signals, and one or more parameters related to the gyroscopes as inputs to a look up table.

In another embodiment of the invention, combining the navigation data with GPS data further includes receiving pseudo range rate data and pseudo rate data from the GPS. The method further includes combining the pseudo range rate data and pseudo rate data with the navigation data.

In another aspect, the invention comprises a system for calibrating acceleration data signals from a set of accelerometers, and angular rate data signals from a set of gyroscopes within a combined GPS/IGS. The system includes a navigation unit for generating navigation data as a function of the acceleration data signals, the angular rate data signals, and prior navigation data. The system further includes a Kalman filter for combining the navigation data with GPS data. The Kalman filter produces corrected navigation data, navigation correction data, acceleration correction data and angular rate correction data. The system further includes a compensator for modifying the acceleration data signals as a function of the acceleration correction data so as to calibrate the acceleration data signals. The compensator also modifies the angular rate data signals as a function of the angular rate correction data, so as to calibrate the angular data signals.

In another embodiment of the invention, the set of accelerometers is constructed and arranged so as to be mutually orthogonal.

In another embodiment of the invention, the set of gyroscopes is constructed and arranged so as to be mutually orthogonal.

In another embodiment of the invention, the acceleration correction data includes at least one acceleration bias correction factor, and the compensator includes an acceleration adder module for adding the at least one acceleration bias correction factor to the acceleration data signals.

In another embodiment of the invention, the acceleration correction data includes three acceleration bias correction factors corresponding to the three accelerometer data signals, and the compensator includes an acceleration adder module for adding each of the three acceleration bias correction factors to the corresponding acceleration data signals.

Another embodiment of the invention further includes a memory device for storing the at least one acceleration bias correction factor.

In another embodiment of the invention, the angular rate correction data includes at least one gyroscope bias correction factor, and the compensator includes a gyroscope adder module for adding the at least one gyroscope bias correction factor to the angular rate data signals.

In another embodiment of the invention, the angular rate correction data includes three gyroscope bias correction factors, and the compensator includes a gyroscope adder module for adding the three gyroscope bias correction factors to the corresponding angular rate data signals.

Another embodiment of the invention, further includes a memory device for storing the at least one gyroscope bias correction factor.

In another embodiment of the invention, the angular rate correction data includes at least one gyroscope scaling correction factor, and the compensator includes a gyroscope multiplier module for multiplying the at least one gyroscope scaling correction factor by the angular rate data signals.

In another embodiment of the invention, the angular rate correction data includes three gyroscope scaling correction factors, and the compensator includes a gyroscope multiplier module for multiplying the three gyroscope scaling correction factors by the corresponding angular rate data signals.

Another embodiment of the invention further includes a memory device for storing the at least one gyroscope scaling correction factor.

Another embodiment of the invention further includes an acceleration calculation module for generating at least one acceleration bias correction factor. The at least one acceleration bias correction factor is a predetermined function of the acceleration correction data, the acceleration data signals, and one or more parameters related to the accelerometers.

Another embodiment of the invention further including a gyroscope bias factor calculation module for generating at least one gyroscope bias correction factor. The gyroscope bias correction factor is a predetermined function of the angular rate correction data, the angular data signals, and one or more parameters related to the gyroscopes.

Another embodiment of the invention further includes a gyroscope scaling factor calculation module for generating at least one gyroscope scaling correction factor. The gyroscope scaling correction factor is a predetermined function of the angular rate correction data, the angular data signals, and one or more parameters related to the gyroscopes.

In another aspect, the invention comprises a system for calibrating acceleration data signals from a set of accelerometers, and angular rate data signals from a set of gyroscopes within a combined GPS/IGS. The system includes means for generating navigation data as a function of the acceleration data signals, the angular rate data signals, and prior navigation data. The system further includes means for combining the navigation data with GPS data, so as to produce corrected navigation data, navigation correction data, acceleration correction data and angular rate correction data. The system also includes means for modifying the acceleration data signals as a function of the acceleration correction data so as to calibrate the acceleration data signals, and means for modifying the angular rate data signals as a function of the angular rate correction data, so as to calibrate the angular data signals.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
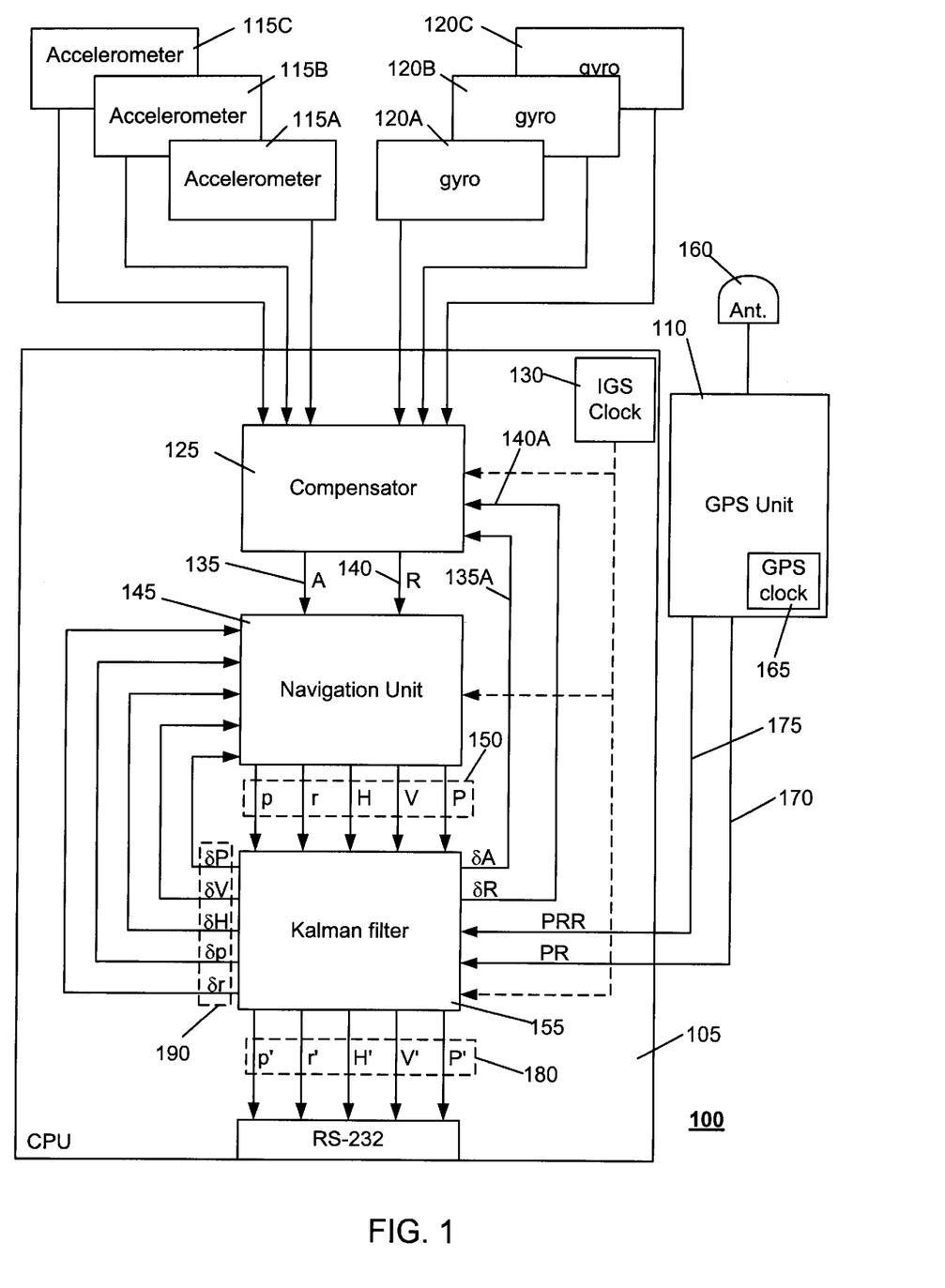
FIG. 1 illustrates one embodiment of a combined GP/IG navigational system according to the present invention.

FIG. 1 illustrates one embodiment of a combined GP/IG navigational system 100 (also referred to herein as GPS/IGS) according to the present invention. System 100 includes an IGS unit 105 a GPS unit 110, accelerometers 115A, 115B and 115C, and gyroscopes 120A, 120B and 120C. The GPS unit 110 includes a GPS clock 165 that maintains time updated from the high-accuracy clocks on the GPS satellites. The GPS unit 110 receives GPS signals from GPS satellites via an antenna 160, and provides pseudo rate data 170 and pseudo range rate data 175 to the IGS unit 105. Accelerometers 115A, 115B and 115C provide acceleration data, and gyroscopes 120A, 120B and 120C provide angular rate data, to the IGS unit 105. The IGS unit 105 includes a compensator 125, a navigation unit 145, and a Kalman filter 155. The IGS unit 105 produces corrected navigation data 180, including corrected position signal P', corrected velocity signal V', corrected heading signal H', corrected roll signal r', and corrected pitch signal p'.

In operation, IGS unit 105 calculates location and position information using data from the accelerometers and the gyroscopes, and integrates this location and position information with the pseudo rate data 170 and the pseudo range rate data 175 derived from GPS unit 110. The end result is corrected navigation data 180 that is provided via an RS 232 interface for use by other systems associated with the GP/IG navigational system 100.

More specifically, the compensator 125 receives acceleration data from accelerometers 115A, 115B, and 115C, and angular rate data from gyroscopes 120A, 120B, and 120C. The compensator further receives acceleration correction data $\delta A$ 135A and angular rate correction data $\delta R$ 140A. Compensator 125 uses the acceleration data, the angular rate data, $\delta A$ 135A and $\delta R$ 140A to compute acceleration data 135 and rate data 140. Navigation unit 145 uses the acceleration data 135 and rate data 140 from the compensator 125, along with navigation correction data 190 from the Kalman filter 155 to compute navigation data 150. The correction data 190 includes correction for position signal $\delta P$, correction for velocity signal $\delta V$, correction for heading signal $\delta H$, correction for pitch signal $\delta p$, and correction for roll signal $\delta r$. The navigation data 150 includes position data P, velocity data V, heading data H, roll data r, and pitch data p. In one embodiment, the compensator 125 includes a software module that is synchronized with navigation unit 145 and the Kalman filter 155 by use of a common reference, IGS clock 130. Other embodiments of the compensator 125 may include a hardware implementation of the compensator functions as described in more detail herein.

The Kalman filter 155 receives the navigation data 150 from the navigation unit 145, along with the pseudo rate data 170 and the pseudo range rate data 175 (when available), and produces corrected navigation data 180, correction data 190, acceleration correction data $\delta A$ 135A and angular rate correction data $\delta R$ 140A. The Kalman filter 155 implements an optimal recursive data processing algorithm that combines all of the available input data (i.e., the navigation data 150, the pseudo rate data 170 and the pseudo range rate data 175) to generate an overall "best estimate" of the corrected navigational data 180. The general nature and structure of a Kalman filter has evolved over the past 40 years and is well known in the art, and is therefore not within the scope of this disclosure. Based on the relationship between the input navigation data 150 and the output corrected navigation data, the Kalman filter 155 also generates the correction data 190 for use by the navigation unit 145 to further refine the available navigational data, along with the acceleration correction data $\delta A$ 135A and angular rate correction data $\delta R$ 140A for the compensator 125.

Figure 2:
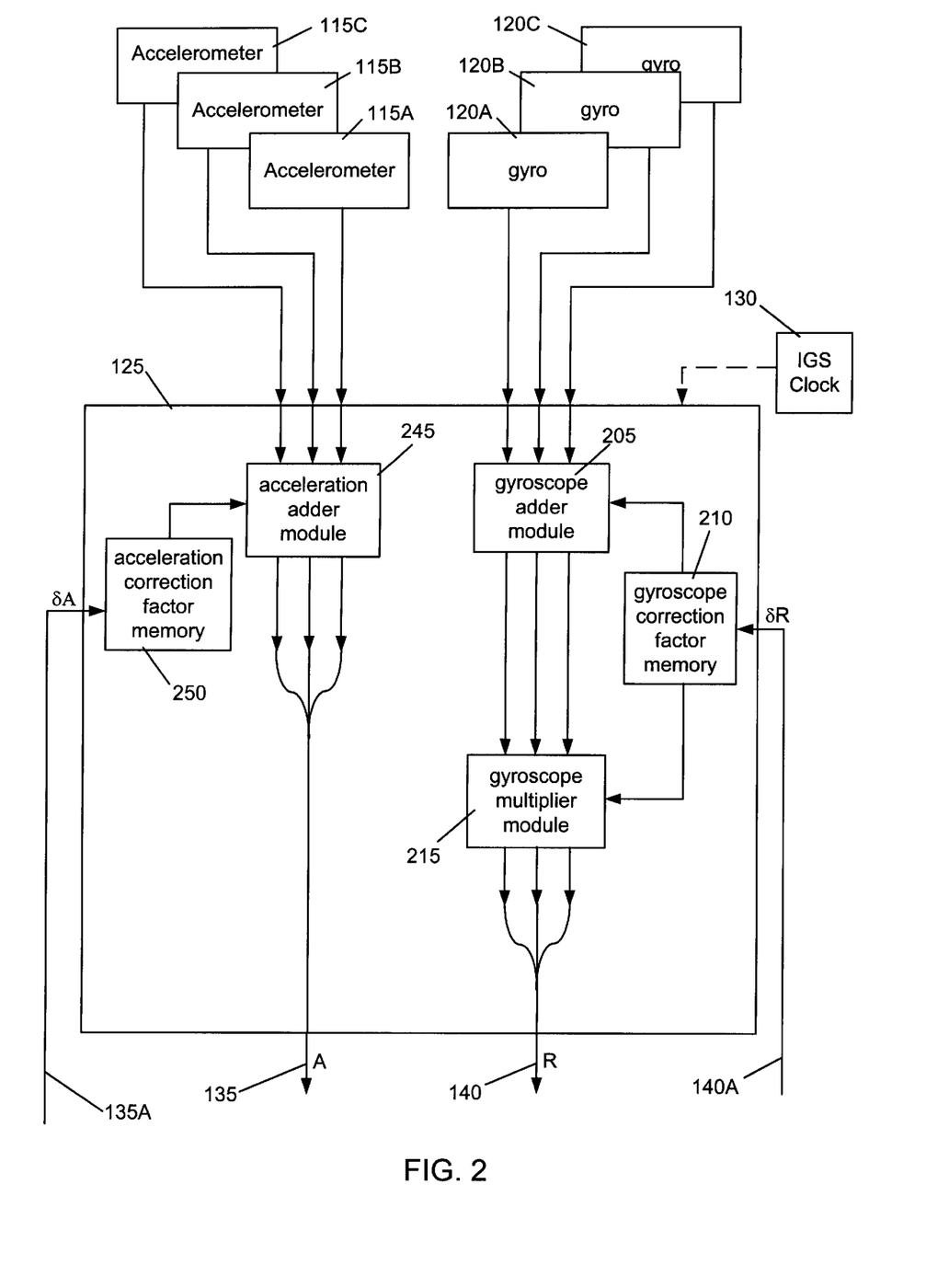
FIG. 2 illustrates a more detailed view of the compensator from a combined GP/IG navigation system of FIG. 1.

FIG. 2 illustrates a more detailed view of the compensator 125 from a combined GP/IG navigation system of FIG. 1. The compensator 125 includes gyroscope adder module 205, gyroscope correction factor memory 210, gyroscope multiplier module 215, acceleration adder module 245, and acceleration correction factor memory 250. IGS clock 130 synchronizes the operation of the compensator 125 with the other navigational functions of the GP/IG navigation system. The acceleration correction factor memory 250 receives the acceleration correction data $\delta A$ 135A from the Kalman filter 155 (see FIG. 1), and the gyroscope correction factor memory 210 receives the angular rate correction data $\delta R$ 140A from the Kalman filter 155. The acceleration correction factor memory 250 provides the most recently stored acceleration correction data $\delta A$ 135A to the acceleration adder module 245. The gyroscope correction factor memory 210 provides the most recently stored angular rate correction data $\delta R$ 140A to the adder module 205 and the multiplier module 215.

The acceleration correction data $\delta A$ 135A from the Kalman filter includes three separate acceleration bias correction factors, one for each of the three accelerometers 115A, 115B and 115C. The three acceleration bias correction factors, referred to herein as $K_{BAA}$, $K_{BAB}$, and $K_{BAC}$, correspond to the three accelerometers 115A, 115B and 115C, respectively. In operation, the acceleration adder module 245 reads the three current acceleration bias correction factors from the acceleration correction factor memory 250 and adds each correction factor to the acceleration data from the corresponding accelerometer output. In particular, the acceleration adder module 245 adds $K_{BAA}$ to the acceleration data from accelerometer 115A, adds $K_{BAB}$ to the acceleration data from accelerometer 115B, and adds $K_{BAC}$ to the acceleration data from accelerometer 115C. The acceleration bias correction factors may be positive or negative, so that a compensation value may be added or subtracted, respectively, from the corresponding acceleration data streams. Further, one or more of the acceleration bias correction factors may include a value of zero, in which case the corresponding acceleration data streams will remain unchanged. The three corrected acceleration data streams exit the compensator 125 as acceleration data 135.

The angular rate correction data $\delta R$ 140A from the Kalman filter 155 includes two components for each of the gyroscope outputs 120A, 120B and 120C. One component is a gyroscope bias correction factor that corrects the gyroscope bias error. The other component is a gyroscope scaling correction factor that corrects the gyroscope scaling error. The three gyroscope bias correction factors are referred to herein as $K_{BGA}$, $K_{BGB}$ and $K_{BGC}$, corresponding to gyroscopes 120A, 120B and 120C, respectively. The three gyroscope scaling correction factors are referred to herein as $K_{SFA}$, $K_{SFB}$, and $K_{SFC}$, corresponding to gyroscopes 120A, 120B and 120C, respectively. In operation, the adder module 205 reads the three current gyroscope bias correction factors from the gyroscope correction factor memory 210 and adds each correction factor to the angular rate data stream from the corresponding accelerometer output. In particular, the adder module adds $K_{BGA}$ to the angular rate data from gyroscope 120A, adds $K_{BGB}$ to the angular rate data from gyroscope 120B, and adds $K_{BGC}$ to the angular rate data from accelerometer 120C. The multiplier module 215 reads the three current scaling correction factors from the gyroscope correction factor memory 210 and multiplies each of the scaling correction factors by the corresponding angular rate data stream. In particular, the multiplier module 215 multiplies $K_{SFA}$ by the angular rate data from gyroscope 120A, multiplies $K_{SFB}$ by the angular rate data from gyroscope 120B, and multiplies $K_{SFC}$ by the angular rate data from gyroscope 120C. The three corrected angular rate data streams exit the compensator 125 as acceleration data 135.

In the embodiment described in FIG. 2, the compensator 125 applies the scaling correction factors to the angular rate data stream after applying the bias correction factors, but in another embodiment the order of application may be reversed. In yet another embodiment, the compensator 125 may apply the bias correction factors and the scaling correction factors simultaneously. In the embodiment described in FIG. 2, the compensator applies the correction factors via digital operations (i.e., the acceleration and angular rate data is in digital form, and the adders and multipliers are digital components). In other embodiments, compensator 125 may apply the correction factors in the analog domain, i.e., via signal offsets and analog multipliers known to those in the art. In some embodiments, the data from the accelerometers and the gyroscopes must be converted to a form usable by the components of the compensator 125. For example, the data from the accelerometers (gyroscopes) may be in analog form, and the acceleration (gyroscope) adder module may be a digital component. In this case, the acceleration (gyroscope) adder module includes an analog to digital converter (ADC) to convert the analog data to digital data usable by the acceleration (gyroscope) adder module. In other embodiments, the incoming data may be digital data, and the components of the compensator 125 may be analog components. In this case, the adder module includes a digital to analog converter (DAC) to convert the incoming data to an analog form usable by the analog-based compensator.

Figure 3:
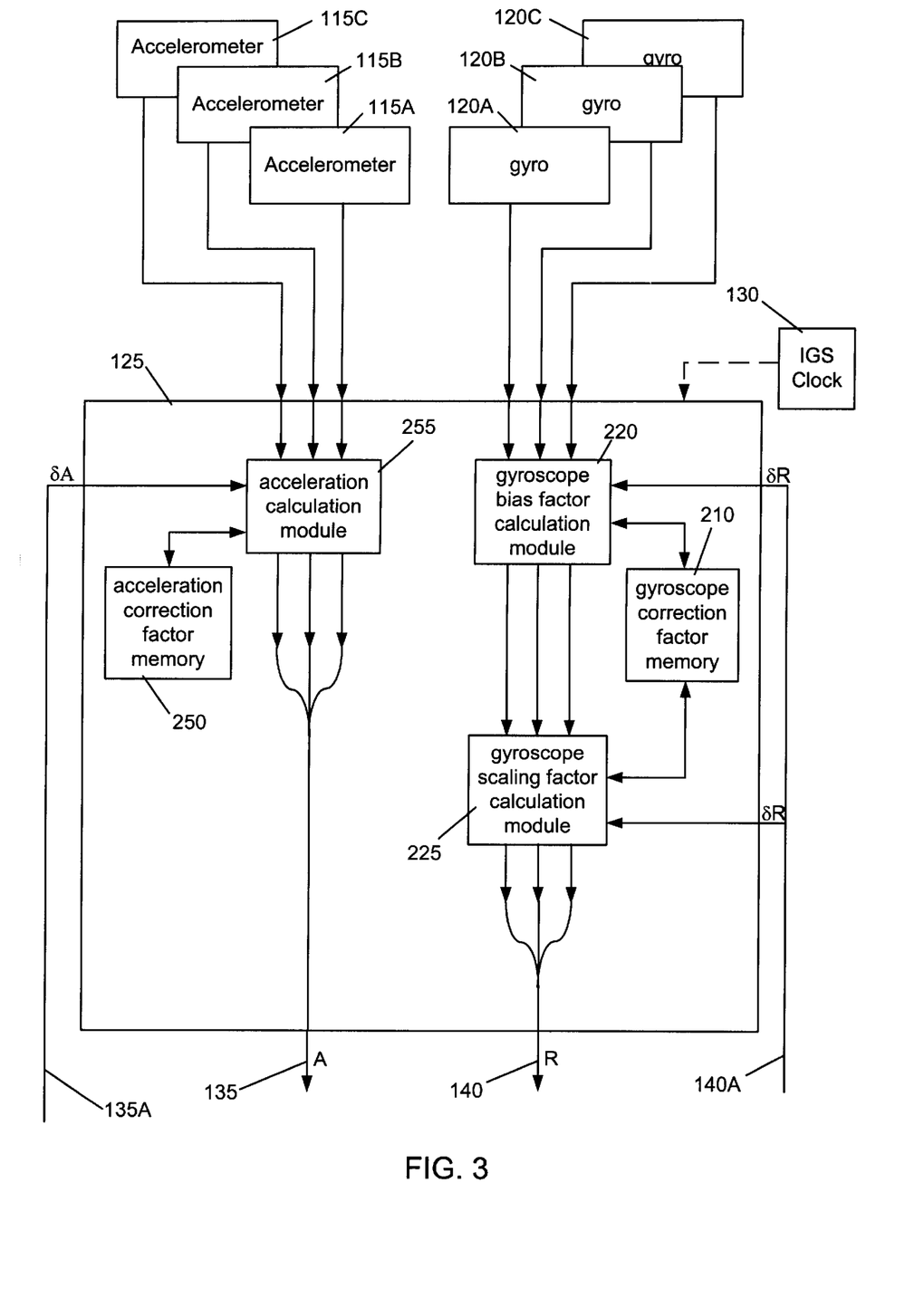
FIG. 3 shows another embodiment of the compensator depicted in FIG. 2.

In another embodiment of the invention, illustrated in FIG. 3, the compensation module 125 includes an acceleration calculation module 255, a gyroscope bias factor calculation module 220, and a gyroscope scaling factor calculation module 225. Relative to the embodiment shown in FIG. 2, the acceleration calculation module 255 replaces the acceleration adder module 245, the gyroscope bias factor calculation module 220 replaces the gyroscope adder module 205, and the gyroscope scaling factor calculation module 225 replaces the gyroscope multiplier module 215. Further, the acceleration correction data $\delta A$ 135A goes directly to the acceleration calculation module 255, and the angular rate correction data $\delta R$ 140A goes directly to the gyroscope bias factor calculation module 220 and to the gyroscope scaling factor calculation module 225.

In the embodiment of FIG. 3, the acceleration calculation module 255 implements an algorithm that combines the acceleration correction data $\delta A$ 135A from the Kalman filter 155 and the value of the acceleration data to produce the three acceleration bias correction factors $K_{BAA}$, $K_{BAB}$, and $K_{BAC}$, as described herein. Once generated, the acceleration calculation module 255 stores $K_{BAA}$, $K_{BAB}$, and $K_{BAC}$ in the acceleration correction factor memory 250. These stored correction factors may be used in the event the acceleration correction data $\delta A$ 135A drops out or otherwise becomes invalid, or they may be used as an initial correction value upon the next system power-up. The algorithm used to produce the acceleration bias correction factors may also use one or more parameters related to the characteristics of the accelerometers. Such parameters are unique to the individual accelerometers and may include information such as known bias error range, bias verses acceleration data characteristics, and other a priori information that may be useful in determining acceleration bias correction factors.

Similarly, the gyroscope bias calculation module 220 and the gyroscope scaling factor calculation module 225 implement algorithms that combine the angular rate data from the gyroscopes and the angular rate correction data $\delta R$ 140A from the Kalman filter 155, to produce three gyroscope bias correction factors and three gyroscope scaling factor correction factors, respectively. The gyroscope bias calculation module 220 stores the gyroscope bias correction factors $K_{BGA}$, $K_{BGB}$ and $K_{BGC}$ in the gyroscope correction factor memory 210, and the gyroscope scaling factor calculation module 225 stores the gyroscope scaling correction factors $K_{SFA}$, $K_{SFB}$, and $K_{SFC}$ in the gyroscope correction factor memory 210. These stored correction factors may be used in the event the angular rate correction data $\delta R$ 140A drops out or otherwise becomes invalid, or they may be used as an initial correction value upon the next system power-up. The algorithm used to produce the gyroscope bias correction factors and the gyroscope scaling correction factors may also use one or more parameters related to the characteristics of the gyroscopes. Such parameters are unique to the individual gyroscopes and may include information such as known bias error range, bias verses angular rate data characteristics, and other a priori information that may be useful in determining gyroscope bias correction factors and gyroscope scaling correction factors.

Figure 4:
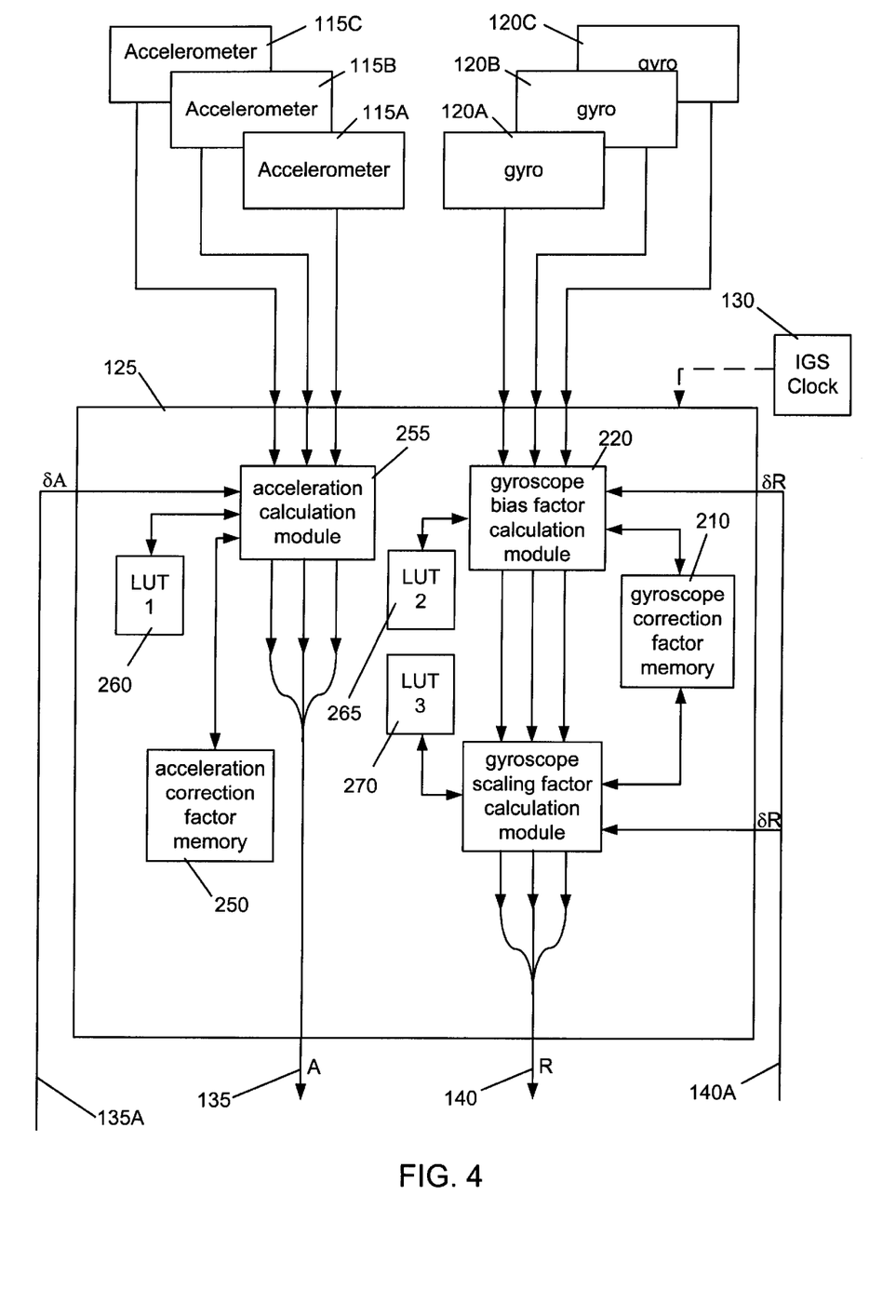
FIG. 4 shows yet another embodiment of the compensator depicted in FIG. 2.

In yet another embodiment, shown in FIG. 4, the acceleration calculation module 255, the gyroscope bias calculation module 220 and the gyroscope scaling factor calculation module 225 calculate respective correction factors based on the incoming acceleration data, angular rate data, acceleration correction data δA and angular rate correction data δR. However, rather than combining the data via an algorithm to produce the respective correction factor (as is done in the embodiment of FIG. 3), the calculation modules use look-up tables (LUTs) such as Programmable Read Only Memories (PROMs) or other non-volatile addressable memory devices known in the art. In the embodiment of FIG. 4, the acceleration calculation module provides addressing information (based on incoming acceleration data from the accelerometers and acceleration correction data δA) to LUT 1 260, and receives acceleration bias correction data therefrom corresponding to the addressing information. The gyroscope bias calculation module 220 provides addressing information (based on angular rate data from the gyroscopes and angular rate correction data δR) to LUT 2 265, and receives gyroscope bias correction data therefrom corresponding to the addressing information. The gyroscope scaling factor calculation module 225 provides addressing information (based on angular rate data from the gyroscopes and angular rate correction data δR) to LUT 3 270, and receives gyroscope scale factor correction data therefrom corresponding to the addressing information. The use of LUTs in this embodiment is advantageous because the data in the LUTs can be customized to the characteristics of the associated accelerometers and gyroscopes. If one or more accelerometers and/or gyroscopes are replaced in the system, the corresponding LUT can be readily changed to match the replacement device.

Figure 5:
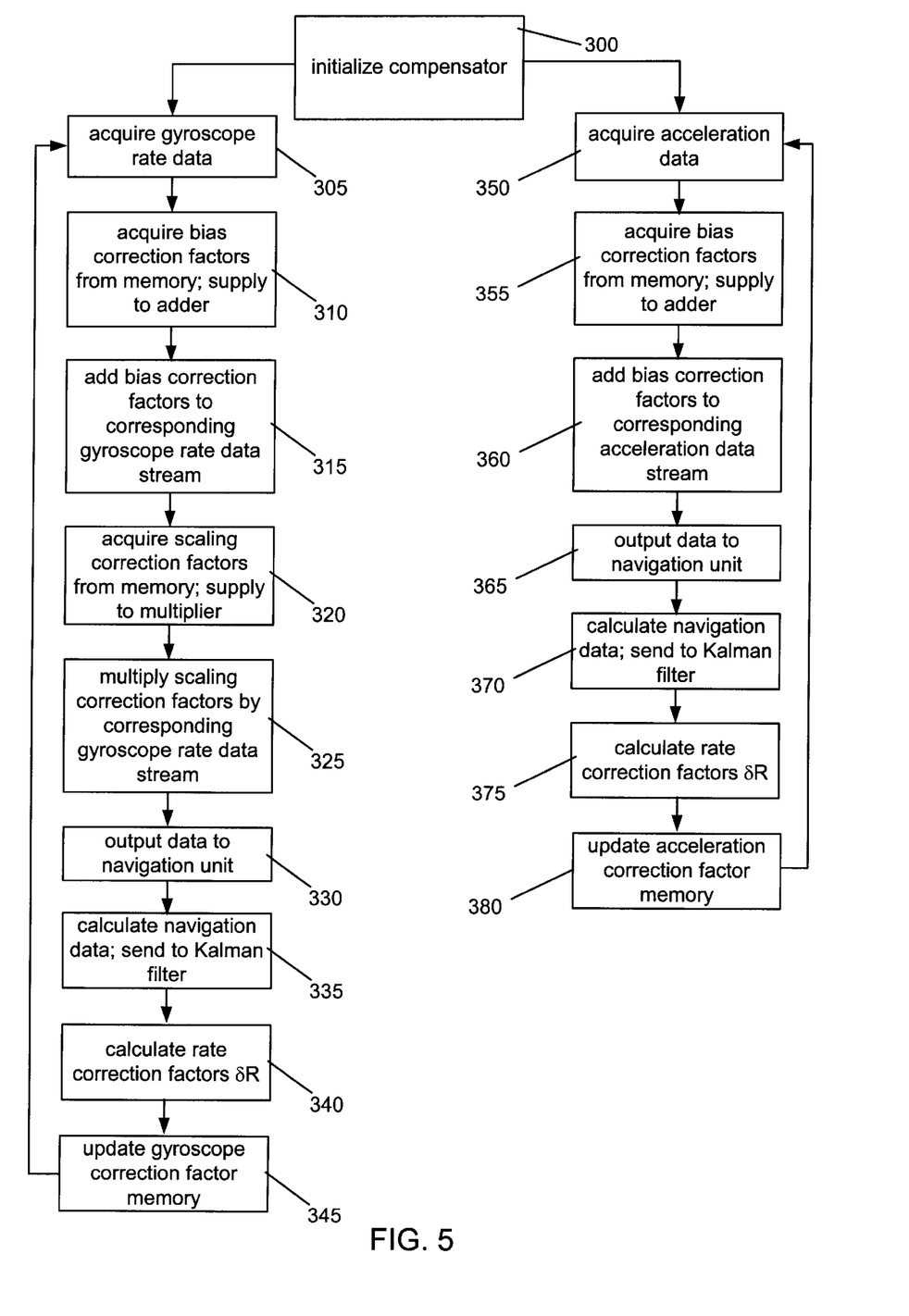
FIG. 5 illustrates a flow diagram describing one method of calibrating a combined GP/IP navigational system, according to the embodiment shown in FIGS. 1 and 2.

FIG. 5 illustrates a flow diagram describing one method of calibrating a combined GP/IP navigational system, according to the embodiment shown in FIGS. 1 and 2. Steps 305 and 340 take place substantially in parallel once the compensator 125 has been initialized in step 300. The method is described as follows:

Step 300 Initializing Compensator

Power is applied to components within compensator 125.

Step 305 Acquire Gyroscope Rate Data

Compensator 125 obtains rate data from gyroscopes 120A, 120B and 120C.

Step 310 Acquire Bias Correction Factors from Memory; Supply to Adder

Compensator 125 acquires last saved bias correction factors $K_{BGA}$, $K_{BGB}$ and $K_{BGC}$ from memory 210, and supplies those correction factors to adder 205.

Step 315 Add Bias Correction Factors to Corresponding Gyroscope Rate Data Stream Adder 205 adds the appropriate bias correction factor to each of the gyroscope data streams.

Step 320 Acquire Scaling Correction Factors from Memory Supply to Multiplier Compensator 125 acquires last saved scaling correction factors $K_{SFA}$, $K_{SFB}$ and $K_{SFC}$ from memory 210, and supplies those correction factors to multiplier 225.

Step 325 Multiply Scaling Correction Factors by Corresponding Gyroscope Rate Data Stream Multiplier 225 multiplies the appropriate scaling correction factor by each of the gyroscope data streams.

Step 330 Output Data to Navigation Unit

Compensator 125 provides corrected rate data R 140 to the navigation unit 145.

Step 335 Calculate Navigation Data; Send to Kalman Filter

The Kalman filter 155 optimizes the navigation data based on past and present navigation information, along with data from the GPS unit 110.

Step 340 Calculate Rate Correction Factors δR

The Kalman filter also generates the rate correction data that the compensator 125 uses to correct data from the gyroscopes.

Step 345 Update Gyroscope Correction Factor Memory

The compensator 125 updates the gyroscope correction factor memory 210 via rate correction data δR.

Step 350 Acquire Accelerometer Data

Compensator 125 obtains acceleration data from accelerometers 115A, 115B and 115C. Step 350 and step 305 are substantially contemporaneous.

Step 355 Acquire Bias Correction Factors from Memory; Supply to Adder

Compensator 125 acquires last saved bias correction factors $K_{BAA}$, $K_{BAB}$ and $K_{BAC}$ from memory 250, and supplies those correction factors to acceleration correction module 255.

Step 360 Add Bias Correction Factors to Corresponding Acceleration Data Stream Acceleration correction module 255 adds the appropriate bias correction factor to each of the acceleration data streams.

Step 365 Output Data to Navigation Unit

Compensator 125 provides corrected acceleration data A 150 to the navigation unit 145.

Step 370 Calculate Navigation Data; Send to Kalman Filter

The Kalman filter 155 optimizes the navigation data based on past and present navigation information, along with data from the GPS unit 110.

Step 375 Calculate Acceleration Correction Factors δA

The Kalman filter also generates the acceleration correction data that the compensator 125 uses to correct data from the accelerometers.

Step 380 Update Gyroscope Correction Factor Memory

The compensator 125 updates the acceleration correction factor memory 250 via rate correction data δR.

The technique described herein requires an external reference signal to confirm the validity of the data used for navigation. In the embodiments disclosed herein, this external navigation data comes from GPS navigation information. Due to satellite blackout periods, there are times that this GPS navigation information is not available. However, external navigation data could be provided in another embodiment by other external references such as digital maps, odometers, magnetic compasses or manual information input.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of calibrating acceleration data signals from a set of accelerometers, and angular rate data signals from a set of gyroscopes within a combined GPS/IGS, comprising:

generating navigation data as a function of the acceleration data signals, the angular rate data signals, and prior navigation data;

combining the navigation data with GPS data via a Kalman filter, so as to produce corrected navigation data, navigation correction data, acceleration correction data and angular rate correction data;

modifying the acceleration data signals as a function of the acceleration correction data so as to calibrate the acceleration data signals, and modifying the angular rate data signals as a function of the angular rate correction data, so as to calibrate the angular data signals.

2. A method according to claim 1, further including receiving the set of acceleration data signals from a set of three mutually orthogonal accelerometers.

3. A method according to claim 1, further including receiving the set of angular rate data signals from a set of three mutually orthogonal gyroscopes.

4. A method according to claim 1, wherein the acceleration correction data includes at least one acceleration bias correction factor, and modifying the acceleration data signals further includes adding the at least one acceleration bias correction factor to the acceleration data signals.

5. A method according to claim 4, wherein the acceleration correction data includes three acceleration bias correction factors corresponding to three accelerometer data signals, and modifying the acceleration data signals further includes adding each of the three acceleration bias correction factors to the corresponding acceleration data signal.

6. A method according to claim 4, further including storing the at least one acceleration bias correction factor in a memory device, subsequently retrieving the at least one acceleration bias correction factor from the memory device, and adding the retrieved acceleration bias correction factor to the corresponding acceleration data signal.

7. A method according to claim 1, wherein the angular rate correction data includes at least one gyroscope bias correction factor, and modifying the angular rate data signals further includes adding the at least one gyroscope bias correction factor to the angular rate data signals.

8. A method according to claim 7, wherein the angular rate correction data includes three gyroscope bias correction factors corresponding to three angular rate data signals, and modifying the angular rate data signals further includes adding each of the three gyroscope bias correction factors to the corresponding angular rate data signal.

9. A method according to claim 7, further including storing the at least one angular rate bias correction factor in a memory device, subsequently retrieving the at least one angular rate bias correction factor from the memory device, and adding the retrieved angular rate bias correction factor to the corresponding angular rate data signal.

10. A method according to claim 1, wherein the angular rate correction data includes at least one gyroscope scaling correction factor, and modifying the angular rate data signals further includes multiplying the at least one gyroscope scaling correction factor by the angular rate data signals.

11. A method according to claim 10, wherein the angular rate correction data includes three gyroscope scaling correction factors corresponding to three angular rate data signals, and modifying the angular rate data signals further includes multiplying each of the three gyroscope scaling correction factors by the corresponding angular rate data signal.

12. A method according to claim 10, further including storing the at least one gyroscope scaling correction factor in a memory device, subsequently retrieving the at least one gyroscope scaling correction factor from the memory device, and multiplying the retrieved gyroscope scaling correction factor to the corresponding angular rate data signal.

13. A method according to claim 1, wherein modifying the acceleration data signals further includes generating at least one acceleration bias correction factor being a predetermined function of (i) the acceleration correction data, (ii) the acceleration data signals, and (iii) parameters related to the accelerometers, and adding the at least one acceleration bias correction factor to the acceleration data signals.

14. A method according to claim 13, wherein generating at least one acceleration bias correction factor further includes combining (i) the acceleration correction data, (ii) the acceleration data signals, and (iii) one or more parameters related to the accelerometers as inputs to an algorithm.

15. A method according to claim 14, wherein the algorithm includes a sequence of operations executed by a processor.

16. A method according to claim 14, wherein the algorithm includes a logic circuit.

17. A method according to claim 13, wherein generating at least one acceleration bias correction factor further includes combining (i) the acceleration correction data, (ii) the acceleration data signals, and (iii) parameters related to the accelerometers as inputs to a look up table.

18. A method according to claim 1, wherein modifying the angular rate data signals further includes generating at least one gyroscope bias correction factor being a predetermined function of (i) the angular rate correction data, (ii) the angular data signals, and (iii) parameters related to the gyroscopes, and adding the at least one gyroscope bias correction factor to the angular rate data signals.

19. A method according to claim 18, wherein generating at least one gyroscope bias correction factor further includes combining (i) the angular rate correction data, (ii) the angular data signals, and (iii) parameters related to the gyroscopes as inputs to an algorithm.

20. A method according to claim 19, wherein the algorithm includes a sequence of operations executed by a processor.

21. A method according to claim 19, wherein the algorithm includes a logic circuit.

22. A method according to claim 18, wherein generating at least one gyroscope bias correction factor further includes combining (i) the angular rate correction data, (ii) the angular data signals, and (iii) parameters related to the gyroscopes as inputs to a look up table.

23. A method according to claim 1, wherein modifying the angular rate data signals further includes generating at least one gyroscope scaling correction factor being a predetermined function of (i) the angular rate correction data, (ii) the angular data signals, and (iii) parameters related to the gyroscopes, and multiplying the at least one gyroscope scaling correction factor by the angular rate data signals.

24. A method according to claim 23, wherein generating at least one gyroscope scaling correction factor further includes combining (i) the angular rate correction data, (ii) the angular data signals, and (iii) parameters related to the gyroscopes as inputs to an algorithm.

25. A method according to claim 24, wherein the algorithm includes a sequence of operations executed by a processor.

26. A method according to claim 24, wherein the algorithm includes a logic circuit.

27. A method according to claim 23, wherein generating at least one gyroscope scaling correction factor further includes combining (i) the angular rate correction data, (ii) the angular data signals, and (iii) parameters related to the gyroscopes as inputs to a look up table.

28. A method according to claim 1, wherein combining the navigation data with GPS data further includes receiving pseudo range rate data and pseudo rate data from the GPS and combining the pseudo range rate data and pseudo rate data with the navigation data.

29. A system for calibrating acceleration data signals from a set of accelerometers, and angular rate data signals from a set of gyroscopes within a combined GPS/IGS, comprising:
- a navigation unit for generating navigation data as a function of the acceleration data signals, the angular rate data signals, and prior navigation data;
- a Kalman filter for combining the navigation data with GPS data, so as to produce corrected navigation data, navigation correction data, acceleration correction data and angular rate correction data;
- a compensator for modifying the acceleration data signals as a function of the acceleration correction data so as to calibrate the acceleration data signals, and modifying the angular rate data signals as a function of the angular rate correction data, so as to calibrate the angular data signals.

30. A system according to claim 29, wherein the set of accelerometers is constructed and arranged so as to be mutually orthogonal.

31. A system according to claim 29, wherein the set of gyroscopes is constructed and arranged so as to be mutually orthogonal.

32. A system according to claim 29, wherein the acceleration correction data includes at least one acceleration bias correction factor, and the compensator includes an acceleration adder module for adding the at least one acceleration bias correction factor to the acceleration data signals.

33. A system according to claim 29, wherein the acceleration correction data includes three acceleration bias correction factors corresponding to the three accelerometer data signals, and the compensator includes an acceleration adder module for adding each of the three acceleration bias correction factors to the corresponding acceleration data signals.

34. A system according to claim 32, further including a memory device for storing the at least one acceleration bias correction factor.

35. A system according to claim 29, wherein the angular rate correction data includes at least one gyroscope bias correction factor, and the compensator includes a gyroscope adder module for adding the at least one gyroscope bias correction factor to the angular rate data signals.

36. A system according to claim 29, wherein the angular rate correction data includes three gyroscope bias correction factors, and the compensator includes a gyroscope adder module for adding the three gyroscope bias correction factors to the corresponding angular rate data signals.

37. A system according to claim 35, further including a memory device for storing the at least one gyroscope bias correction factor.

38. A system according to claim 29, wherein the angular rate correction data includes at least one gyroscope scaling correction factor, and the compensator includes a gyroscope multiplier module for multiplying the at least one gyroscope scaling correction factor by the angular rate data signals.

39. A system according to claim 29, wherein the angular rate correction data includes three gyroscope scaling correction factors, and the compensator includes a gyroscope multiplier module for multiplying the three gyroscope scaling correction factors by the corresponding angular rate data signals.

40. A system according to claim 38, further including a memory device for storing the at least one gyroscope scaling correction factor.

41. A system according to claim 29, further including an acceleration calculation module for generating at least one acceleration bias correction factor being a predetermined function of (i) the acceleration correction data, (ii) the acceleration data signals, and (iii) parameters related to the accelerometers.

42. A system according to claim 29, further including a gyroscope bias factor calculation module for generating at least one gyroscope bias correction factor being a predetermined function of (i) the angular rate correction data, (ii) the angular data signals, and (iii) parameters related to the gyroscopes.

43. A system according to claim 29, further including a gyroscope scaling factor calculation module for generating at least one gyroscope scaling correction factor being a predetermined function of (i) the angular rate correction data, (ii) the angular data signals, and (iii) parameters related to the gyroscopes.

44. A system for calibrating acceleration data signals from a set of accelerometers, and angular rate data signals from a set of gyroscopes within a combined GPS/IGS, comprising:
- means for generating navigation data as a function of the acceleration data signals, the angular rate data signals, and prior navigation data;
- means for combining the navigation data with GPS data, so as to produce corrected navigation data, navigation correction data, acceleration correction data and angular rate correction data;
- means for modifying the acceleration data signals as a function of the acceleration correction data so as to calibrate the acceleration data signals, and for modifying the angular rate data signals as a function of the angular rate correction data, so as to calibrate the angular data signals.

* * * * *